United States Patent
Smerdon, Jr.

(10) Patent No.: US 6,279,803 B1
(45) Date of Patent: Aug. 28, 2001

(54) BICYCLE HANDLEBAR-MOUNTED CARRIER

(76) Inventor: E. Thomas Smerdon, Jr., 4001 Newhall Rd., Columbus, OH (US) 43220

(*) Notice: Subject to any disclaimer, the term of this patent is extended or adjusted under 35 U.S.C. 154(b) by 0 days.

(21) Appl. No.: 09/387,587

(22) Filed: Aug. 31, 1999

(51) Int. Cl.[7] ........................................ B62J 7/06
(52) U.S. Cl. .................... 224/420; 224/431; 224/432
(58) Field of Search .................................. 224/420, 431, 224/432, 421; 248/99

(56) References Cited

U.S. PATENT DOCUMENTS

| | | |
|---|---|---|
| 3,955,728 | 5/1976 | Jackson et al. . |
| 4,021,994 * | 5/1977 | Mainprice ................ 53/390 |
| 4,056,219 | 11/1977 | Hine, Jr. . |
| 4,066,196 | 1/1978 | Jackson et al. . |
| 4,260,086 | 4/1981 | Hine, Jr. et al. . |
| 4,313,548 | 2/1982 | Edelson . |
| 4,315,583 | 2/1982 | Hine, Jr. . |
| 4,415,105 * | 11/1983 | Jackson .................. 224/41 |
| 4,440,332 * | 4/1984 | Kullen .................... 224/36 |
| 4,542,839 | 9/1985 | Levine et al. . |
| 4,570,835 | 2/1986 | Criqui et al. . |
| 4,598,846 | 7/1986 | Schroeder . |
| 4,638,933 * | 1/1987 | Boufford ................. 224/41 |
| 4,754,902 | 7/1988 | Opfergelt . |
| 4,798,318 | 1/1989 | Irwin . |
| 5,375,748 | 12/1994 | Katz . |
| 5,497,920 * | 3/1996 | Moeller et al. ............ 224/36 |
| 5,526,907 * | 6/1996 | Trawick et al. ........... 190/111 |
| 5,752,687 | 5/1998 | Lynch . |
| 5,803,328 | 9/1998 | Nakahara . |

* cited by examiner

Primary Examiner—Stephen P. Garbe

(57) ABSTRACT

An article carrier for food and other small items that is supported forward of the junction of a bicycle handlebar and handlebar stem. The carrier is comprised of a frame, a means for stabilizing the frame, and, in the preferred embodiment, a flexible bag. The frame of the carrier has a middle section that passes under the handlebar stem and two sides that pass over the handlebar and extend away from each other and then converge toward each other, with each side having an end that terminates roughly in front of its respective side of the handlebar stem. A stabilization means, which is preferably an elastic shock cord, is attached to one side of the frame at a point in front of the handlebar and passed under the handlebar, over the handlebar stem, and back under the handlebar to a point of attachment on the other side of the frame. The flexible bag of the preferred embodiment has a removable top cover and a sleeve running along an upper section of the bag, with the sleeve being adapted to slide onto the sides of the frame and the bag being dimensioned so that the top of the bag is maintained in an open configuration when the bag is fully inserted onto the frame. In an alternative embodiment, a rigid molded carrier is adapted to be inserted into the frame and engage the sides of the frame.

6 Claims, 4 Drawing Sheets

BICYCLE HANDLEBAR-MOUNTED CARRIER

TECHNICAL FIELD OF INVENTION

The present invention is in the field of bicycles and bicycling. The present invention relates generally to bicycle handlebar bags and packs, and more specifically to a small article carrier that is mounted in front of the junction of the handlebar and handlebar stem.

BACKGROUND OF THE INVENTION

Bicycle handlebar bags and packs have long been used by touring and other long distance cyclists to carry various items. These bags are typically used on road bikes with dropped handlebars. They generally have a box-like shape and are relatively large, occupying most of the space in front of the handlebar and between the brake levers. The bags or their support frames are often stabilized to prevent the bag from swaying or bouncing.

Prior art reveals a number of systems for attaching and stabilizing traditional handlebar bags. For example, U.S. Pat. No. 3,955,728 to Jackson, et al. (1976) shows a bag that is attached to the brake levers by means of hook and loop fastener straps and stabilized by means of elastic cords that attach to the lower ends of the front fork. U.S. Pat. No. 4,066,196 to Jackson, et al. (1978) shows a support frame with a center section that passes under the handlebar stem and over the handlebar and which then forms a U-shape. The sides of the frame are parallel and extend forwardly from the handlebar. The bag has pockets on each side that slide over the forward sections of the frame and can be stabilized by tension members that extend from the bottom sides of the bag and attach to the ends of the front fork.

Similarly to Jackson, et al. '196, U.S. Pat. No. 4,056,219 to Hine (1977) shows a frame that cantilevers over the handlebar with two prongs that project forward parallel to each other and engage sleeves in the sides of the bag. The Hine '219 support also includes at least one additional frame member that extends downward and engages the back of the handlebar pack. In the preferred embodiment, two downwardly-extending frame members are used that attach to an elastic shock cord that loops through the bicycle frame to stabilize the pack. U.S. Pat. No. 4,260,086 to Hine (1981) shows an improved method of securing the bag to the wire frame, which involves spring clips at the rear of the bag that snap onto the frame. U.S. Pat. No. 4,313,548 to Edelson (1981) shows a wire frame that attaches to the handlebar in a manner similar to Hine '219 and '086 and Jackson, et al. '196, but that has prongs that curve upward to engage a cleat at the rear of the bag. The bag is stabilized by a resilient material that engages the bicycle frame. U.S. Pat. No. 4,542,839 to Levine, et al. (1985) discloses a support bracket that attaches to the handlebar similarly to Edelson '548, but that terminates in a "V" shape, where it engages a compatibly shaped mounting fixture on the back of the bag, as opposed to the cleat system of Edelson '548. The support bracket is secured by means of an elastic rope that loops through the bicycle frame and attaches to a tubular member that engages two U-shaped prongs at the lower end of the support bracket.

Another means of stabilizing the mounting bracket is shown in U.S. Pat. No. 4,315,583 to Hine (1982). This patent discloses a second wire bracket that attaches to the handlebar and handlebar stem opposite the bag support frame. The second bracket and the support frame are then clamped together at a point just forward of the handlebar.

Still other handlebar bag mounting systems are shown in U.S. Pat. No. 4,598,846 to Schroeder (1986), U.S. Pat. No. 4,798,318 to Irwin (1989) and U.S. Pat. No. 5,375,748 to Katz (1994).

Traditional handlebar bags, including those disclosed by the above-referenced patents, suffer from a number of disadvantages. Because of their size and shape, they are not well suited for road bicycles with derailleur shifter cables that extend directly from the brake levers into the area in front of the handlebar. Many road bikes are equipped with this type of derailleur shifting system. Moreover, traditional handlebar bags and their attachment hardware tend to be quite heavy and cumbersome, which compromises the bicycle's handling characteristics and renders such bags unsuitable for cyclists who place a premium on light weight and aerodynamics. In addition, the large capacity of such bags is useless for riders who desire to use a handlebar bag only for carrying food and other small items that are often carried in the back pockets of a cycling jersey.

Furthermore, modern handlebar stems vary considerably in their shape and the angle at which the stem projects forward from the bicycle frame. Consequently, when mounted on many modern handlebar stems, traditional cantilevered wire support frames often will not extend horizontally from the handlebar without bending the frame. However, the heavy wire gauge required to support the loaded weight of these traditional bags makes it difficult and impractical to bend the support frame to accommodate the differences in handlebar stem shape.

The methods disclosed in previous patents for stabilizing the bag and support frame also have a number of disadvantages. The use of elastic shock cords that attach at the ends of the front fork preferably require fender eyelets on the fork ends, which are missing on many road bikes. Furthermore, these cords, and the large packs they help to stabilize, appear ungainly on lightweight road racing bicycles. The support bracket disclosed by Hine '219 cannot be economically manufactured by a conventional wire-bending process alone, because it requires an additional support member that is perpendicular to the plane of the forwardly-extending prongs. The cleat and bracket systems disclosed by Edelson "548 and Levine, et al. '839 require special attachment hardware to be mounted to the back of the bag, as does the spring clip system disclosed by Hine '086. The use of a second wire bracket and clamping hardware to stabilize the support frame, as disclosed by Hine '583, adds weight and makes the installation and removal of the support frame a more time-consuming process.

The need for a small, lightweight handlebar bag for carrying food and other small items has not been adequately addressed by prior art. The prior art discloses several handlebar-mounted beverage container holders, such as U.S. Pat. No. 4,570,835 to Criqui, et al. (1986), U.S. Pat. No. 4,754,902 to Opfergelt (1988) and U.S. Pat. No. 5,752,687 to Lynch (1998), but these are not suitable for carrying loose articles. For road bicycles with aerobars mounted to the handlebar, U.S. Pat. No. 5,803,328 to Nakahara (1998) shows a water bottle carrier and small food bag that is suspended by straps that attach to the aerobar extensions. However, such an aerobar-mounted carrier has the significant limitation of not working with the great majority of bicycles, including mountain bikes.

SUMMARY OF THE INVENTION

The present invention addresses the need for a small and lightweight handlebar-mounted carrier for holding food and other items that a cyclist can conveniently access while riding. Some of the objects and advantages of the present invention are:

(a) to provide a handlebar bag that will accommodate the various derailleur shifter cable and brake lever cable configurations commonly found on road and mountain bikes;

(b) to provide a handlebar bag support frame that will accommodate a wide range of handlebar stem shapes and angles and that can be easily installed and removed without the need for tools;

(c) to provide a handlebar bag that can be quickly and easily mounted and removed, without the need for special mounting hardware attached to the bag;

(d) to provide a simple and effective method of stabilizing the support frame that is that does not require clamping hardware or any attachments to the bicycle frame or front fork;

(e) to provide a handlebar bag that is lightweight and aerodynamic and that does not interfere with the rider's normal hand positions or operation of the brakes and derailleur shifters;

(f) to provide a handlebar bag that can be easily and safely accessed with one hand while riding;

(g) to provide a handlebar bag with a top that can be easily opened or removed if desired;

(h) to provide a handlebar bag that is made from a material suitable for direct food contact, so that special liners or interior bags are unnecessary for food use;

(i) to provide a handlebar bag and support that can be feasibly and economically manufactured.

These and other objects and advantages will become apparent from a consideration of the drawings and the description of the invention.

DETAILED DESCRIPTION OF THE INVENTION

Figure 1:
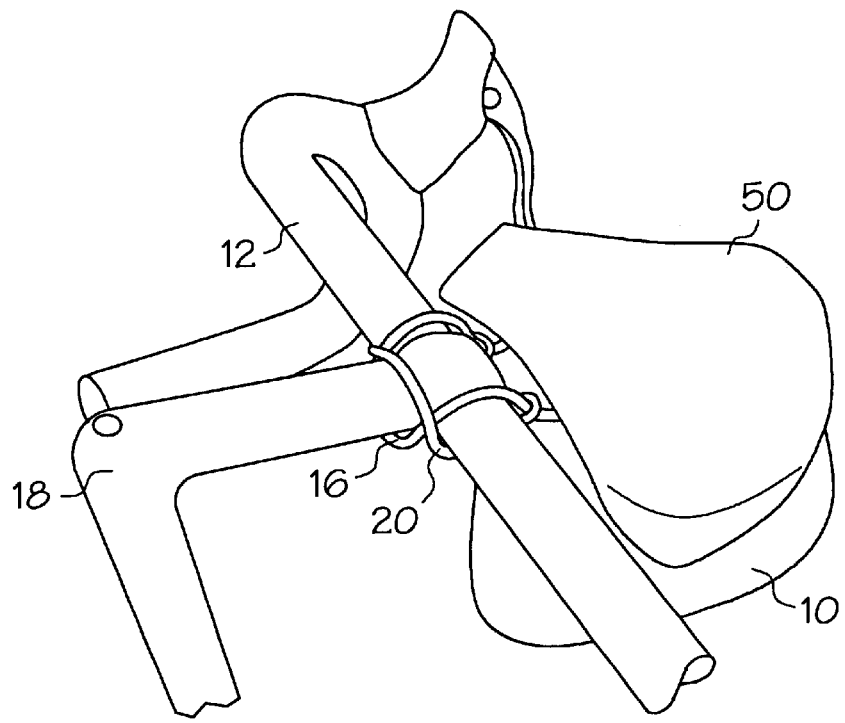
FIG. 1 is a rear perspective view of the handlebar bag of the preferred embodiment mounted on dropped handlebars typical of lightweight road bicycles.
Figure 2:
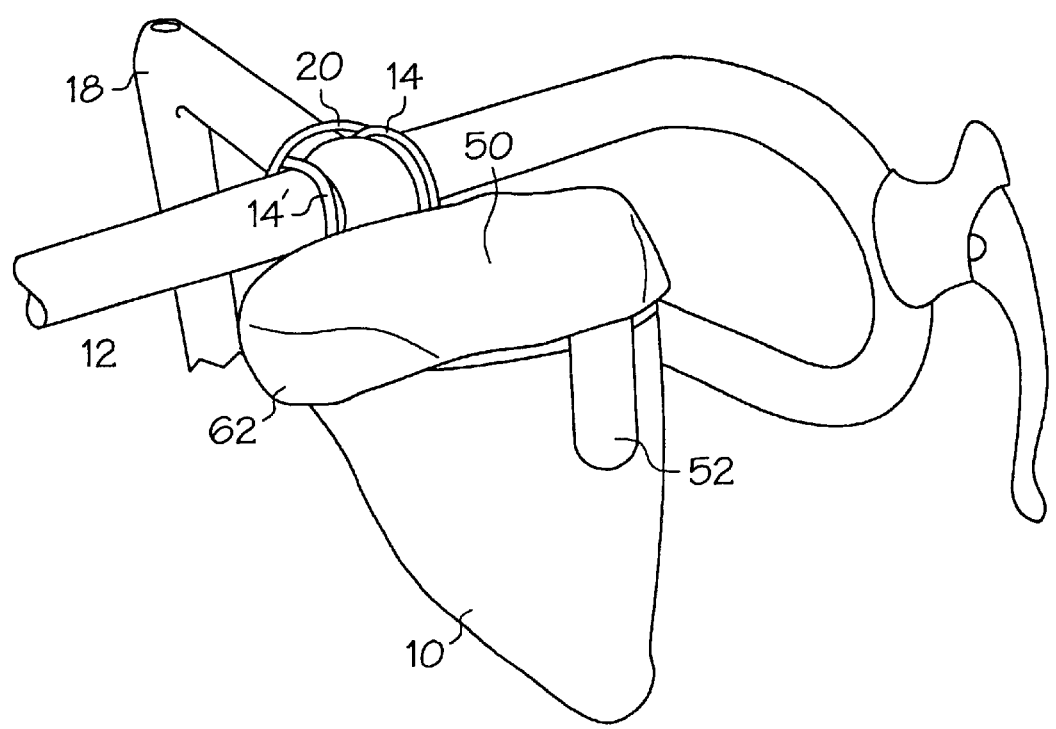
FIG. 2 is a front perspective view of the handlebar bag of the preferred embodiment.

FIGS. 1 and 2 show the handlebar bag 10 of the preferred embodiment mounted forward of the type of dropped handlebar 12 typically found on adult road bicycles. The handlebar bag is mounted by first positioning the support frame, shown in FIG. 3, so that the sides 14, 14' of the frame cantilever over the handlebar and the middle section 16 of the frame passes under the handlebar stem 18. In the preferred embodiment, a stabilization means 20 is secured to one side of the frame, and from there passes under the handlebar, over the handlebar stem, and back under the handlebar to a point of attachment on the other side of the frame.

Figure 3:
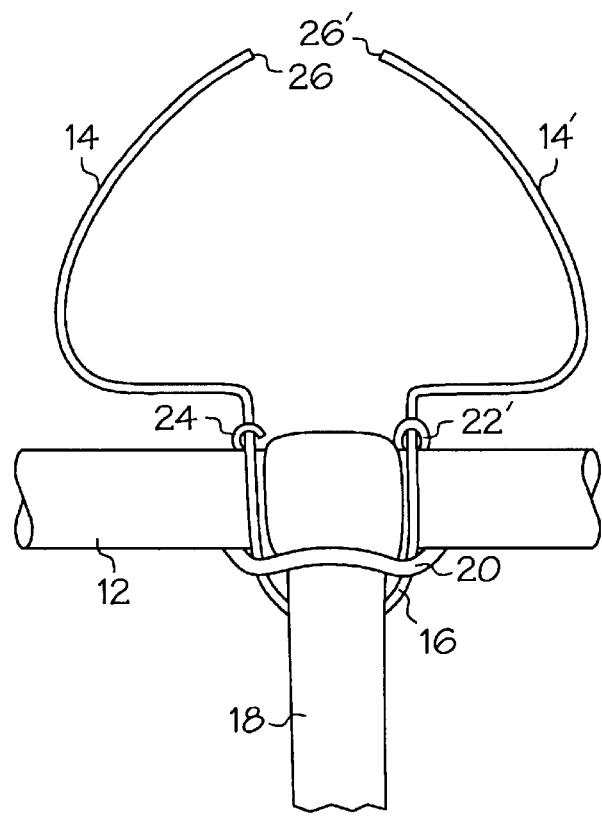
FIG. 3 is a perspective view from above showing the frame of the preferred embodiment mounted at the junction of the handlebar and handlebar stem.
Figure 4:
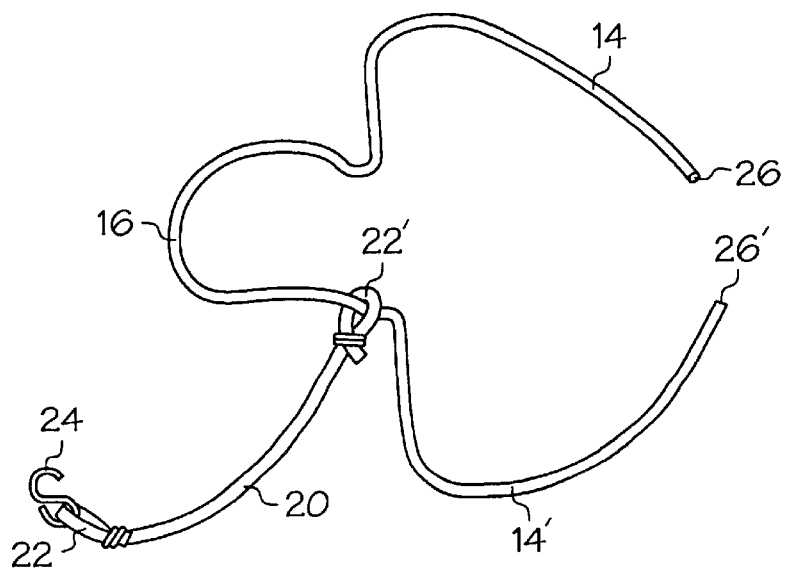
FIG. 4 is a perspective view of the frame of the preferred embodiment and the preferred elastic stabilization means.

FIG. 4 shows a perspective view of just the frame and stabilization means of the preferred embodiment. Preferably, the stabilization means is a length of elastic shock cord in which both ends have been formed into small loops 22, 22'. One end of an S-hook 24 is closed around one of the loops, so that the S-hook cannot fall off. The loop in the other end of the cord slides over one side of the frame. In the preferred embodiment, as illustrated in FIG. 3, the loop and S-hook are both secured to the frame at points just in front of the handlebar.

In the preferred embodiment of the stabilization means, an elastic cord with a diameter of ⅜" and an elasticity of at least 100 percent, combined with a standard S-hook with an overall length of ¾", has been shown to work well with the preferred frame. Although other diameters and types of hooks, including standard shock cord hooks, will also work, the preferred embodiment of the stabilization means has the advantage of being attractive, secure, and inexpensive. The stabilization method disclosed by the present invention also has the advantage of allowing the use of a relatively short (when unstretched) length of elastic cord, unlike prior art stabilization cords that pass through the bicycle frame or that are attached at locations at the ends of the bicycle's front fork. It is also much easier to optimize the length of the elastic stabilization cord of the present invention because the distance traveled by the elastic cord will not vary significantly from bike to bike, unlike the distance traveled by a cord stretched through the bicycle frame or to the fork ends. The latter distance can vary considerably depending on the reach and height above the bicycle frame of the handlebar stem.

The frame can also be stabilized by means of two hook and loop fastening straps that have been adapted to slide onto a respective side of the frame. The straps are passed under the handlebar on their respective sides of the handlebar stem and then are pulled over the handlebar stem and fastened together.

As illustrated in FIGS. 3 and 4, the frame's middle section 16 that passes under the handlebar stem is preferably U-shaped. The sections of the frame that cross over the handlebar are preferably curved with a radius somewhat larger than that of a standard handlebar. After passing over the handlebar, the sides 14, 14' of the frame extend away from each other and then return toward each other, with the ends 26, 26' of each side terminating at points roughly in front of their respective side of the handlebar stem 18. Preferably, the sides of the frame are symmetrical, so that they appear to be mirror images of each other when the frame is viewed from above. In addition, the two sides of the frame should describe a shape that is appropriate for the handlebar bag's intended purpose. A shape similar to that illustrated in FIG. 3, in which the sides extend away from each other roughly parallel to the handlebar and then bend and converge toward each other, works well in creating a convenient opening for a small handlebar bag. The area of the opening should be large enough to accommodate a closed fist and the frame should not be so wide as to interfere with a rider's normal hand positions on the handlebar. In particular, a frame shape that has been shown to work well is one in which the opening at the top of the bag is approximately 6 inches across (in the dimension parallel to the handlebar) at its maximum and approximately 4.5 inches from the rear center to the front of the bag. However, it can be easily appreciated that the shape of the frame can vary considerably, depending on the bag's intended function, desired capacity, and other considerations. For example, a circular-shaped frame is better suited for a beverage carrier application, while a frame with an inverted "V" or arrowhead shape may be preferred when a pronounced aerodynamic profile is sought.

The frame itself is preferably formed from a single length of stainless steel wire, which is bent into the desired shape by conventional wire forming methods. The gauge of the wire should be sufficiently light to permit the sides of the frame to be bent by hand in order to adjust the angle at which the sides project forwardly from the handlebar. This angle of projection will vary depending on personal preference, but typically it will be a few degrees above horizontal. The adjustability of this angle is necessary for the frame to be able to accommodate a wide variety of handlebar stem shapes, including differences in the angle at which the handlebar stem projects forward. The wire gauge should also be sufficient for the frame to maintain its shape when the handlebar bag is filled. Spring temper stainless steel wire is especially preferred for the frame because it provides the desired characteristics in a relatively small wire diameter, which is lighter and more attractive on the bike. A spring temper stainless steel wire with a diameter in the range of 0.09 to 0.12 inches is suitable for a general purpose small handlebar bag, although smaller or larger diameters may be preferable for certain special handlebar bag applications or for beverage carriers. After the wire has been formed and cut, the sharp edges around the ends 26, 26' of the wire should be beveled or rounded to prevent snagging when the handlebar bag is mounted onto the frame. In addition, the middle section of the frame that comes into contact with the handlebar and handlebar stem should be provided with a covering, such as vinyl coating, to protect the finish of the handlebar and handlebar stem.

Figure 5:
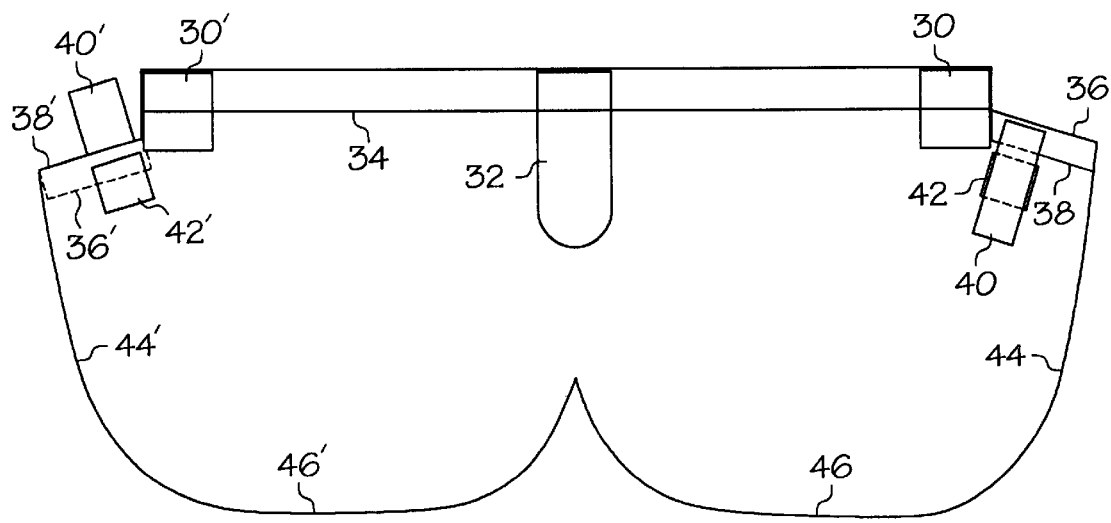
FIG. 5 shows a sewing pattern for the exterior surface of the handlebar bag of the preferred embodiment.

The preferred handlebar bag is made from a single piece of flexible yet sturdy material. FIG. 5 shows generally a cutting pattern for the flexible bag of the preferred embodiment. After the bag pattern is cut, strips of preferably 1" wide loop fastener material are sewn in locations 30, 30' that, after the bag's sleeve is sewn, will surround the openings at each end of the sleeve. A longer length of 1" wide loop fastener is sewn at a location 32 that will be on the top front, and outside, of the bag. The top center section of the fabric is folded at a location 34 below its top edge and sewn, forming a sleeve with openings at each end that are reinforced by the loop fastener strips. The bag is mounted onto the frame by inserting each end of the frame into a respective sleeve opening and sliding the sleeve onto the frame sides. Accordingly, the openings of the sleeve should be large enough for the sides of the frame to pass through without difficulty.

The edges 36, 36' at each end of the top of the fabric are preferably folded over along locations 38, 38' (with the fabric having been appropriately cut to permit such a fold) and sewn for a more finished appearance. Loop- or hook-sided fastening tabs 40, 40' can also be sewn on the inside of the bag to provide an additional means of securing the bag to the frame. When the bag is mounted on the frame, the tabs are folded over the frame and fastened to corresponding hook or loop mating patches 42, 42' sewn on the outside of the bag at appropriate locations. The fastening tab and mating patch may both be sewn onto the bag fabric before the top edge 36 is folded by first sewing on the mating patch 42, then positioning the fastening tab 40 onto the mating patch and sewing it to the area between the top edge 36 and the fold location 38. The fastening tab and mating patch can then be separated and top edge folded over and sewn. The next step is to fold the bag fabric in the middle, along the lengthwise center of loop fastener strip 32, and to sew the aligned outer edges 44, 44' and bottom edges 46, 46' together.

Figure 6:
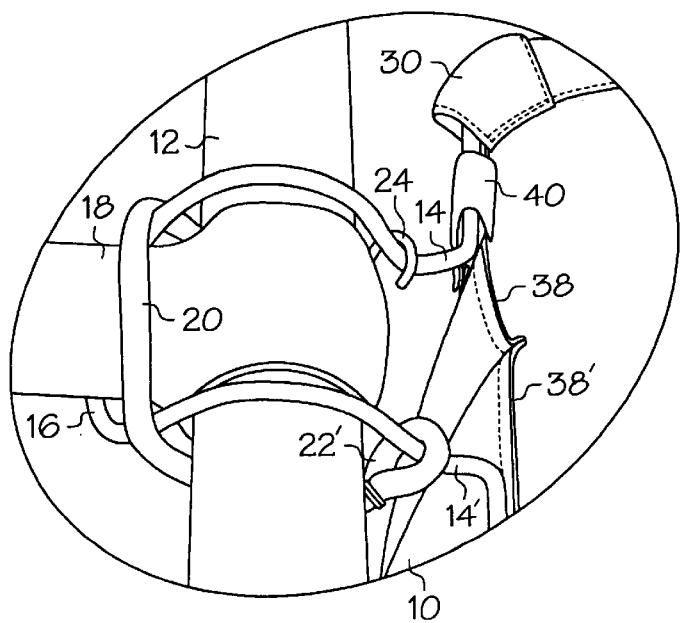
FIG. 6 is detailed perspective view of the frame, stabilization means, and handlebar bag in the area around the junction of the handlebar and handlebar stem.

FIG. 6 shows a detailed view of fastening tab 40 secured to frame side 14, and loop faster strip 30 sewn so that it surrounds the edge of the opening of the sleeve. As shown by FIG. 6, when the bag of the preferred embodiment is fully inserted onto the frame, the location of the sleeve openings should roughly correspond to the points at which the sides of the frame begin to curve forward from their parallel orientation to the handlebar. Accordingly, the bag's construction should allow the sleeves to be fully inserted to the desired points on the sides of the frame, so that the top of the bag is maintained in an fully open configuration and the sides of the bag are kept relatively taut.

Figure 7:
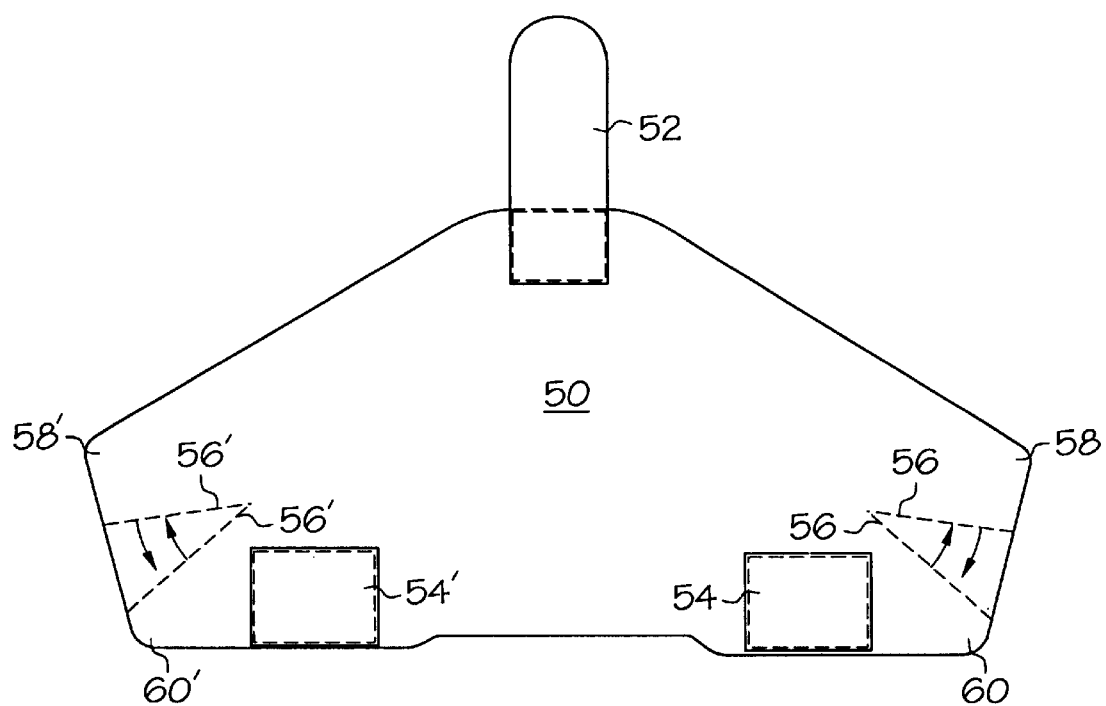
FIG. 7 shows a sewing pattern for the interior surface of the removable top cover of the preferred embodiment of the handlebar bag.
Figure 8:
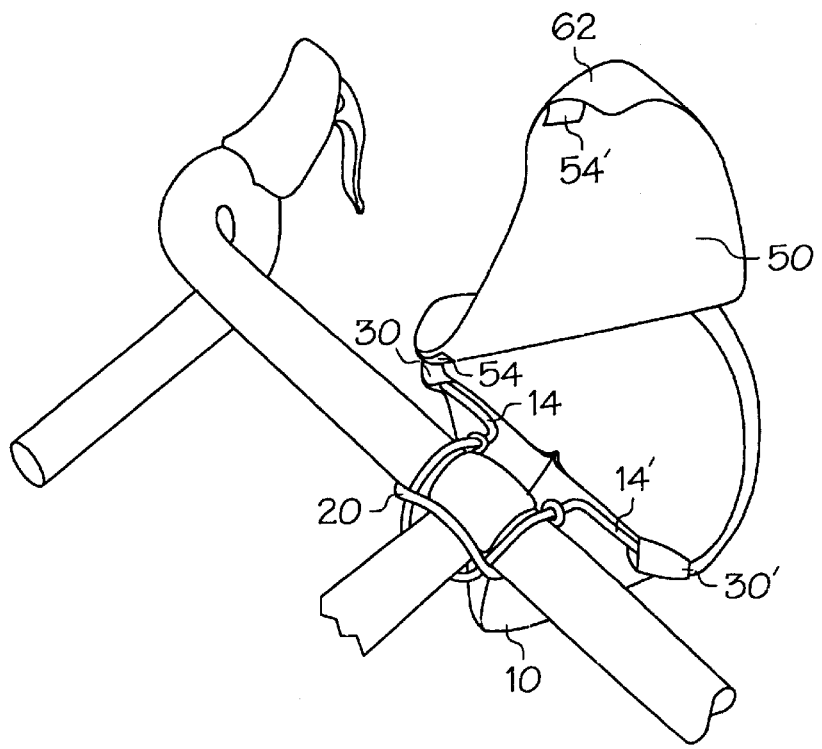
FIG. 8 is a perspective view of the handlebar bag's removable top partially lifted to expose the inside of the bag.

FIG. 7 shows a pattern for the removable top cover 50 of the bag of the preferred embodiment. A hook fastener tongue 52 and two hook fastener strips 54, 54' are sewn onto the underside of the top cover at locations corresponding to the loop fastener strips at the front and rear, respectively, of the bag. The sides of the top cover are then folded at locations 56, 56' so that the front corner 58, 58' of each side is directly over its respective rear corner 60, 60'. The folds are then sewn together, forming a downward-extending flap 62 on the sides of the top cover, as shown in FIG. 8. The contents of the bag can be accessed with one hand while riding by simply lifting one flap up, which separates the hook and loop contact points on the top cover and bag. Or, the opening of the bag can be completely exposed by lifting both flaps and allowing the top cover to hang in front of the bag, secured by its hook fastener tongue.

The fabric for the flexible bag should be durable and able to withstand exposure to sun and rain. In addition, if the bag is used for carrying food items, the bag must comply with Food and Drug Administration requirements for direct food contact. These requirements could be satisfied by incorporating a liner inside the bag or by using a separate inner food pouch. However, from the standpoint of both user convenience and manufacturing cost, it is preferable that the bag fabric itself be suitable for direct food contact. The preferred fabric for the flexible bag of the present invention is woven polypropylene fabric of the type used as filtration media in the food and beverage processing industries. This material has a number of advantages. It is lightweight, yet relatively stiff, so the bag maintains its aerodynamic shape when mounted on the frame. The bag maintains its open shape even when removed from the frame, so it can be conveniently washed by hand and dried much like a plastic food storage container. The polypropylene fabric has good weather resistance and toughness, so it will hold up well, and yet it is easily sewn. The woven polypropylene sheds rain water well, but will also allow any water that collects in the bag to drain out. This fabric can be precisely cut with an electric hot knife or other means that melts the edge of the fabric to prevent fraying, thereby eliminating the need to finish the edges around the bag's top cover.

It can of course be appreciated that a variety of bag construction methods and materials can be used in the bag of the present invention. Furthermore, a rigid plastic carrier will also work effectively with the wire frame of the present invention. A rigid plastic carrier can be molded into any number of interesting shapes, and can mounted simply by inserting it into a suitably shaped wire frame. Preferably, the rigid carrier is molded with an overhanging lip around its top edge. When the carrier is inserted into the area within the sides of the frame, the lip engages the sides of the wire frame in a manner that prevents the sides from springing outward.

While the present invention has been described with respect to specific embodiments, it is to be understood that other modifications and changes may be made to the disclosed embodiments without departing from the spirit and scope of the invention as defined by the following claims.

I claim:

1. An article carrier for mounting on the handlebar of a bicycle, including a bent wire carrier support frame having a roughly U-shaped middle section adapted to engage the underside of the handlebar stem and frame sides adapted to extend over the handlebar on each side of the handlebar stem and to support a carrying means forward of the handlebar, the improvement comprising
   (a) a stabilization means comprised of an elastic cord having one end adapted to attach to one side of said frame at a location in front of the handlebar and the other end adapted to detachably fasten to a corresponding location on the other side of said frame, and adapted to extend under the handlebar and over the handlebar stem; and
   (b) a carrying means comprised of a flexible bag made from a single piece of fabric having top, outer, and bottom edges, said piece of fabric having been folded and sewn along a middle portion of its top edge to form a sleeve and having been folded and sewn together along its outer and bottom edges, with said sleeve being adapted to slide onto the sides of said frame.

2. The article carrier of claim 1 wherein said elastic cord has a loop formed on one end and adapted to slide onto one side of said frame and a hook secured to the other end and adapted to detachably hook onto the other side of said frame.

3. The article carrier of claim 1 wherein said flexible bag includes a removable top cover having a hook and loop fastening tab extending from the front center of said top cover and adapted to mate with a corresponding hook and loop fastening patch on the front of said bag and having two hook and loop fastening patches located roughly opposite one another under respective rear corner areas of said top cover and adapted to mate with corresponding hook and loop fastener patches on said bag.

4. An article carrier for mounting on a bicycle having a handlebar and handlebar stem, said carrier including a bent wire carrier support frame having a roughly U-shaped middle section which is adapted to engage the underside of the handlebar stem, and two frame sides adapted to extend over the handlebar on each side of the handlebar stem and to support a carrying means forward of the handlebar, the improvement comprising:

A stabilization means comprised of an elastic cord having a loop formed on one end of said cord and a hook attached to the other end, with the loop end of said cord being secured around one of said frame sides at a location which will lie just in front of the junction of the handlebar and handlebar stem on one side of the handlebar stem when the carrier is attached to a bicycle, and the hook end of said cord being detachably secured to the other of said frame sides at a location which will lie in front of the junction of the handlebar and handlebar stem on the other side of the handlebar stem with said cord extending under the handlebar and over the handlebar stem when the carrier is attached to the bicycle.

5. An article carrier for mounting on the handlebar of a bicycle, including a bent wire carrier frame having a roughly U-shaped middle section adapted to engage the underside of the handlebar stem and frame sides adapted to extend over the handlebar on each side of the handlebar stem and to extend away from each other and then converge toward each other so that the frame sides terminate opposite one another on their respective sides of the handlebar stem in front of the handlebar, the improvement comprising:

a carrying means comprised of a flexible bag made from a single piece of fabric having top, outer, and bottom edges, said piece of fabric having been folded and sewn along a middle portion of its top edge to form a sleeve and having been folded and sewn together along its outer and bottom edges, with said sleeve being adapted to slide onto the sides of said frame.

6. The article carrier of claim 5 wherein said flexible bag includes a removable top cover having a hook and loop fastening tab extending from the front center of said top cover and adapted to mate with a corresponding hook and loop fastening patch on the front of said bag and having two hook and loop fastening patches located roughly opposite one another under respective rear corner areas of said top cover and adapted to mate with corresponding hook and loop fastener patches on said bag.

* * * * *